(12) United States Patent
Tabata et al.

(10) Patent No.: US 9,814,969 B2
(45) Date of Patent: Nov. 14, 2017

(54) VIDEO GAME PROCESSING APPARATUS AND VIDEO GAME PROCESSING PROGRAM

(71) Applicant: KABUSHIKI KAISHA SQUARE ENIX, Tokyo (JP)

(72) Inventors: Hajime Tabata, Tokyo (JP); Masayasu Nishida, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

(21) Appl. No.: 14/155,689

(22) Filed: Jan. 15, 2014

(65) Prior Publication Data

US 2014/0200083 A1 Jul. 17, 2014

(30) Foreign Application Priority Data

Jan. 16, 2013 (JP) .................. 2013-005737

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/30 | (2014.01) |
| A63F 13/45 | (2014.01) |
| A63F 13/795 | (2014.01) |
| A63F 13/822 | (2014.01) |

(52) U.S. Cl.
CPC ............ *A63F 13/12* (2013.01); *A63F 13/45* (2014.09); *A63F 13/795* (2014.09); *A63F 13/822* (2014.09)

(58) Field of Classification Search
CPC ............ G07F 17/3272; G07F 17/3274; G07F 17/3283
See application file for complete search history.

(56) References Cited

FOREIGN PATENT DOCUMENTS

| | | |
|---|---|---|
| JP | 2003-047769 | 2/2003 |
| JP | 2003-340161 | 12/2003 |

(Continued)

OTHER PUBLICATIONS

Lummis, Michael et al, BradyGames: World of Warcraft Official Strategy Guide, 2004, Blizzard Entertainment, pp. 1-30.*

(Continued)

*Primary Examiner* — Milap Shah
*Assistant Examiner* — Jason Pinheiro
(74) *Attorney, Agent, or Firm* — Greenblum & Bernstein, P.L.C.

(57) ABSTRACT

A video game processing apparatus for controlling progress of a multiplayer participatory video game is provided. A player plays the multiplayer participatory video game using a game medium in which parameters are set up. The video game processing apparatus includes a virtual mission information memory for storing virtual mission information. The virtual mission information is information on virtual missions. The player works on one of the virtual missions using the game medium. The video game processing apparatus provides the virtual mission to the player on the basis of the virtual mission information. The video game processing apparatus gives other player a game medium associated with the player using the game medium. The other player is associated with the game medium used in the virtual mission.

20 Claims, 12 Drawing Sheets

(56) References Cited

FOREIGN PATENT DOCUMENTS

| JP | 2010-042083 | 2/2010 |
| JP | 2010-142306 | 7/2010 |
| JP | 2011-188887 | 9/2011 |
| JP | 2011-206442 | 10/2011 |
| JP | 2012-125286 | 7/2012 |

OTHER PUBLICATIONS

Office Action from Japan Patent Office (JPO) in Japanese Patent Application No. 2013-005737, dated Dec. 24, 2013, along with an English language translation thereof.
Kadokawa Corporation Enterbrain, "Sengoku Bushoki-Muramasa-", Famitsu Mobage, pp. 52-53 (Jun. 21, 2012), along with an English language translation thereof.
Office Action from Japan Patent Office (JPO) in Japanese Patent Appl. No. 2014-260726, dated Dec. 13, 2016, together with a partial English language translation.
"'Dragon Coins Koryaku' Event Kikanchu ni Mission wo Clear suruto Kinkyu Mission ga Syutsugen!", Famitsu App, Kadokawa Dwango Corporation, pp. 1-6 (Dec. 14, 2012), available at http://app.famitsu.com/20121214_115512/.
"Road to Dragon", Dengeki Game Appli, ASCII Media Works Inc., vol. 7, pp. 102-103 (Dec. 14, 2012).
Office Action from Japan Patent Office (JPO) in Japanese Patent Appl. No. 2014-260726, dated Jul. 11, 2017, together with a partial English language translation.

\* cited by examiner

100: VIDEO GAME PROCESSING SYSTEM

Fig. 4

VIRTUAL MISSION INFORMATION

| MISSION NUMBER | REQUIRED ACTION POWER | CONTINUOUS BATTLE NUMBER | ENEMY CHARACTER INFORMATION | ... | EXPERIENCE VALUE | ITEM |
|---|---|---|---|---|---|---|
| 0001 | 2 | 3 | CHARACTER A<br>CHARACTER B<br>BOSS CHARACTER C | ... | 100 | ITEM A |
| 0002 | 2 | 3 | ..... | ... | 150 | ITEM B |
| 0003 | 4 | 4 | ..... | ... | 300 | ITEM C |
| ⋮ | ⋮ | ⋮ | ⋮ | ⋮ | ⋮ | ⋮ |

Fig. 5

PLAYER INFORMATION

| PLAYER NUMBER | STATUS | | | | | | |
|---|---|---|---|---|---|---|---|
| | LEVEL | ACTION POWER | RESCUE POINT | CLASS POINT | FRIEND POINT | ... | POSSESSED VIRTUAL CARD |
| 0001 | 10 | 5/5 | 3 | 0 | 200 | ... | NPC CARD A<br>NPC CARD B<br>PLAYER CARD A<br>(PLAYER 0002)<br>PLAYER CARD B<br>(PLAYER 0003)<br>..... |
| 0002 | 20 | 8/10 | 5 | 3 | 400 | ... | ..... |
| 0003 | 30 | 20/20 | 0 | 10 | 1000 | ... | ..... |
| ⋮ | ⋮ | ⋮ | ⋮ | ⋮ | ⋮ | ⋮ | ⋮ |

Fig .6

VIRTUAL CARD INFORMATION

| VIRTUAL CARD NUMBER | TYPE | ... | PARAMETER (LEVEL 1) | | | | ... |
|---|---|---|---|---|---|---|---|
| | | | OFFENSIVE POWER | ... | HP | MP | |
| 0001 | PLAYER CARD | ... | 10 | ... | 100 | 10 | ... |
| 0002 | PLAYER CARD | ... | 15 | ... | 100 | 10 | ... |
| 0003 | PLAYER CARD | ... | 20 | ... | 100 | 10 | ... |
| ⋮ | ⋮ | ⋮ | ⋮ | ⋮ | ⋮ | ⋮ | ⋮ |
| 0101 | NON-PLAYER CARD | ... | 100 | ... | 2000 | 100 | ... |
| ⋮ | ⋮ | ⋮ | ⋮ | ⋮ | ⋮ | ⋮ | ⋮ |

MISSION RESULT DISPLAY SCREEN

FRIEND APPLICATION RECEIVING SCREEN

VIDEO GAME PROCESSING APPARATUS AND VIDEO GAME PROCESSING PROGRAM

CROSS-REFERENCE TO RELATED APPLICATION

The present application relates to subject matter contained in Japanese Patent Application No. 2013-5737, filed on Jan. 16, 2013, the disclosure of which is expressly incorporated herein by reference in its entirety.

BACKGROUND OF THE INVENTION

1. Field of the Invention

The present invention relates to a video game processing apparatus and a video game processing program for controlling progress of a multiplayer participatory video game played using a game medium in which parameters are set up.

2. Description of the Related Art

A conventional video game system (for example, an online game system) has been configured so as to transmit and/or receive game medium (for example, ones displayed as a card form on a game screen that shows a virtual space; for example, virtual cards) between a plurality of players in order to exchange self-introduction and an in-game item. His or her own information of each of the plurality of players is registered in the game medium. In such video game systems, there is one in which character information can be registered in a game medium, whereby a communication competition (battle) between players is achieved (for example, see Japanese Patent Application Publication No. 2010-142306). In this regard, the game medium described herein means an in-game item which is available when a player plays a video game.

However, in the conventional video game system, there has been a problem that it is difficult for each player to provide a feeling to cooperate with other players who play the same video game to cause the video game to proceed, whereby the video game may be lacking in interest as a network game.

SUMMARY OF THE INVENTION

The present invention has been made in order to solve the problem described above, and it is an object of the present invention to allow a video game to provide a feeling to cooperate with other player to each player of the video game.

In order to achieve the above object, in one aspect of the present invention, the present invention is directed to a video game processing apparatus for controlling progress of a multiplayer participatory video game. In this case, the multiplayer participatory video game is played by a player using a game medium in which parameters are set up. The video game processing apparatus according to the present invention includes a virtual mission information memory for storing virtual mission information, the virtual mission information being information on virtual missions, a player of the video game processing apparatus working on one of the virtual missions using the game medium.

The video game processing apparatus also includes a virtual mission provider for providing a virtual mission to the player on the basis of the virtual mission information.

The video game processing apparatus also includes a game medium giver for giving other player a game medium associated with the player using the game medium, the other player being associated with the game medium used in the virtual mission.

By configuring the video game processing apparatus as described above, it is possible to provide feeling to cooperate with other player to each player of the video game.

In the video game processing apparatus according to the present invention, it is preferable that the video game processing apparatus further includes: a player information memory for storing player information, the player information indicating a status of each of a plurality of players, a game medium possessed by each of the plurality of players and other player associated with the game medium; an other player status specifier for specifying, at predetermined timing, a status of the other player corresponding to the game medium possessed by the player; and a parameter updater for updating one or more predetermined parameter on the basis of the status of the other player specified by the other player status specifier, the one or more predetermined parameter being set up in the game medium.

In the video game processing apparatus according to the present invention, it is preferable that the video game processing apparatus further includes: a game medium display controller for selectably displaying the game medium, wherein, in a case where the parameter updater updated one or more one parameter of the game medium, the game medium display controller displays the game medium together with at least a part of the one or more updated parameter.

In the video game processing apparatus according to the present invention, it is preferable that the video game processing apparatus further includes: a rescued player specifier for specifying a player who fails the virtual mission provided by the virtual mission provider as a player to be rescued; a rescue mission specifier for specifying a rescue mission to rescue the player to be rescued on the basis of the virtual mission information stored in the virtual mission information memory; an informer for informing the plurality of players of the rescue mission; and a rescue mission executing player specifier for specifying a rescue mission executing player, the rescue mission executing player being a player who carries out the rescue mission. In this case, virtual mission provider may provide the rescue mission to the specified rescue mission executing player, and the game medium giver may give the game medium associated with the player to be rescued to the rescue mission executing player who succeeded the rescue mission.

In the video game processing apparatus according to the present invention, it is preferable that the video game processing apparatus further includes: a game medium information memory for storing game medium information, the game medium information containing information on the game medium, the information on the game medium containing information on a player associated game medium and information on a non-associated game medium, the player associated game medium being a game medium associated with a specific player, the non-associated game medium being a game medium not associated with the specific player; a player associated game medium selection receiver for receiving a selection of a multiplayer associated game medium from the player; a non-associated game medium determiner for determining a non-associated game medium in accordance with a predetermined rule, the non-associated game medium corresponding to the multiplayer associated game medium selected by the player; a non-associated game medium giver for giving the player the non-associated game medium determined by the non-associated game medium determiner.

Moreover, in another aspect of the present invention, the present invention is directed to a non-transitory computer-readable medium containing a video game processing program product for causing a computer to control progress of a multiplayer participatory video game. In this case, the multiplayer participatory video game is played by a player using a game medium in which parameters are set up. Further, the computer includes a virtual mission information memory for storing virtual mission information, the virtual mission information being information on virtual missions, a player of the video game processing apparatus working on one of the virtual missions using the game medium.

The video game processing program product according to the present invention causes the computer to execute steps including providing a virtual mission to the player on the basis of the virtual mission information.

The steps also include giving other player a game medium associated with the player using the game medium, the other player being associated with the game medium used in the virtual mission.

According to the present invention, it is possible to provide a feeling to cooperate with other player to each player of a video game.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 4 is an explanatory drawing showing an example of a storage state of virtual mission information;

FIG. 5 is an explanatory drawing showing an example of a storage state of player information;

FIG. 6 is an explanatory drawing showing an example of a storage state of virtual card information;

DETAILED DESCRIPTION OF THE INVENTION

Hereinafter, examples of embodiments of the present invention will be described with reference to the appending drawings. In this regard, various components in the example of each embodiment described below can be adequately combined as long as the combination causes no contradiction or the like. Further, the content described as an example of one embodiment will not be described in another embodiment in some cases. Furthermore, the content of operations and/or processing with no relationship to characteristic parts of each embodiment will be omitted in some cases. Still further, orders of various types of processing which make various flows described below are random orders as long as the orders cause no contradictions of processing content.

First Embodiment

Figure 1:
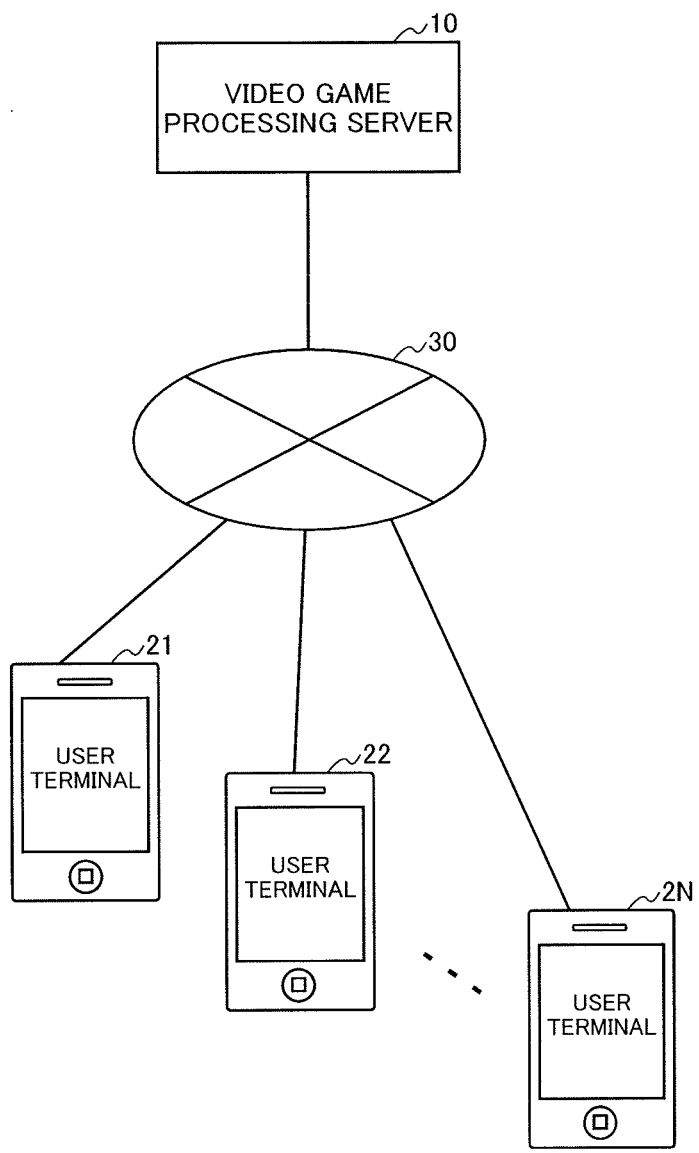
FIG. 1 is a block diagram showing a configuration example of a video game processing apparatus.

FIG. 1 is a block diagram showing a configuration example of a video game processing system 100 according to one embodiment of the present invention. As shown in FIG. 1, the video game processing system 100 includes: a video game processing server 10; and a plurality of user terminals 21 to 2N ("N" is an arbitrary integer) respectively used by a plurality of users. In this regard, the configuration of the video game processing system 100 is not limited to this configuration. The video game processing system 100 may be configured so that a single user terminal is used by a plurality of users. Alternatively, the video game processing system 100 may be configured so as to include a plurality of servers.

Each of the video game processing server 10 and the plurality of user terminals 21 to 2N is connected to a communication network 30 such as the Internet. In this regard, although it is not shown in the drawings, each of the plurality of user terminals 21 to 2N is connected to the communication network 30 by carrying out data communication with a base station managed by a carrier by means of a wireless communication line.

The video game processing system 100 has various kinds of functions to control progress of a video game (a so-called online game) in which a plurality of players plays in the same virtual space (including a synchronous virtual space and an asynchronous virtual space).

The video game processing server 10 is managed by an administrator of the video game processing system 100, and has various kinds of functions to provide (or deliver) information on the video game to the user terminals 21 to 2N.

The video game processing server 10 is configured by an information processing apparatus such as a WWW server, and includes a storage medium for storing various kinds of information. In this regard, it is preferable that in the video game processing system 100, the information regarding the video game is managed by the video game control server 10 in the light of the fact that a processing load on each of the plurality of user terminals 21 to 2N is to be reduced in the video game processing system 100. However, the video game processing system 100 may be configured so that each of the plurality of user terminals 21 to 2N manages part of the information on the video game.

Figure 2:
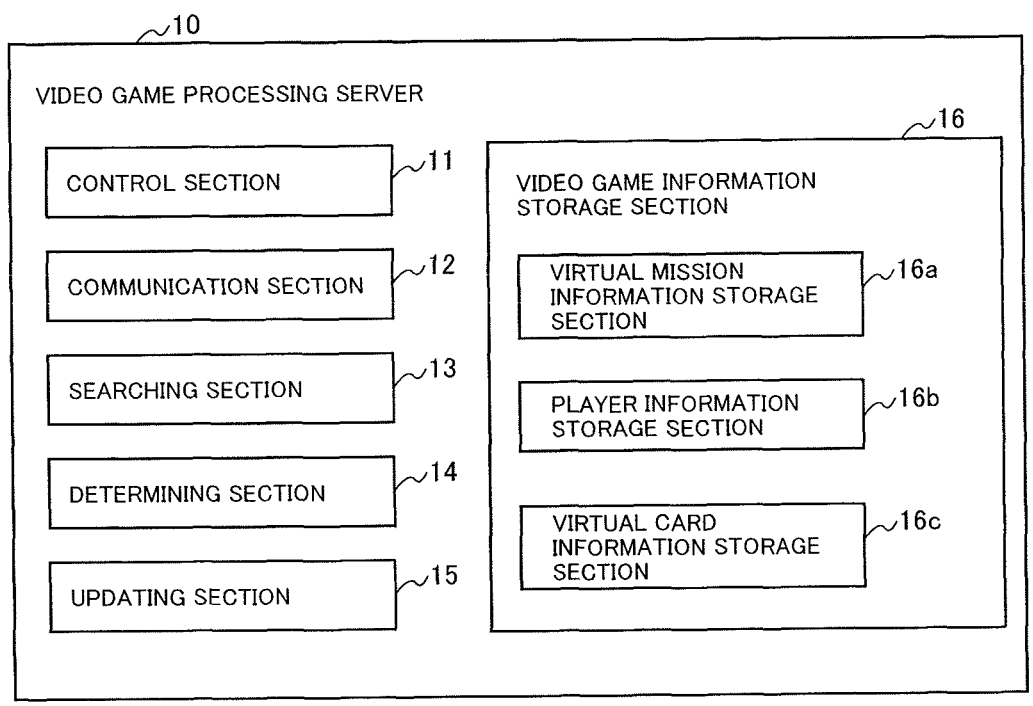
FIG. 2 is a block diagram showing an example of a configuration of a video game processing server.

FIG. 2 is a block diagram showing an example of a configuration of the video game processing server 10. As shown in FIG. 2, the video game processing server 10 includes: a control section 11; a communication section 12; a searching section 13; a determining section 14; an updating section 15; and a video game information storage section 16.

The control section 11 includes a CPU, a ROM and the like, and has a function to carry out controls of the whole video game processing server 10 in accordance with control programs stored in the video game information storage section 16.

The communication section 12 has a function to carry out communication with each of the plurality of user terminals 21 to 2N via the communication network 30 such as the Internet.

The searching section 13 has a function to search for information according to progress of the video game (for example, information according to a progress status of the video garlic in each user terminal) from among various kinds of information stored in the video game information storage section 16.

The determining section 14 has a function to carry out various kinds of determinations in accordance with progress of the video game. In the present embodiment, the determining section 14 has a function to carry out various kinds of determinations in virtual mission related processing (will be described later; see FIG. 7) on the basis of various determination conditions stored in the video game information storage section 16.

The updating section 15 has a function to update various kinds of information stored in the video game information storage section 16 in accordance with progress of the video game. In this regard, the video game processing server 10 may be configured so that the information used for updating processing is acquired from the plurality of user terminals 21 to 2N. Alternatively, the video game processing server 10 may be configured so that such information is prepared in advance in the video game information storage section 16.

The video game information storage section 16 is configured by a database apparatus, for example. The video game information storage section 16 is a storage medium for storing various kinds of information on the video game whose progress is controlled by the video game control system 100 and various kinds of data such as control programs for the video game.

Here, an outline of the video game whose progress is controlled by the video game processing system 100 will be described. In the present embodiment, the video game processing system 100 controls progress of a so-called social RPG (social role-playing game) that is played by the corresponding player in each of the plurality of user terminals 21 to 2N. Namely, the video game processing system 100 controls progress of the video game in which some relationship between the plurality of users who respectively operate the plurality of user terminals 21 to 2N is generated.

In the present embodiment, the video game is configured so that a player (that is, a user of a user terminal) can acquire an experience value, an in-game item or various kinds of points by accomplishing a mission (virtual mission) in a virtual space. Here, the "virtual mission" means a mission in which a player can participate by consuming an "action power (that is, ability to take action)", and is configured so as to accomplish the mission in a case where the player (or a player character) sequentially matches a battle against a plurality of enemy characters and defeats the last boss (sequential battle configuration). In this video game, even though the player fails the mission by satisfying a predetermined failure condition (for example, in a case where the player (or a player character) becomes a battle impossible state in the middle of the mission), the player can acquire a privilege (in the present embodiment, an experience value and an in-game item) when the other player rescues the player to accomplish the mission.

Further, in the video game according to the present embodiment, the player is allowed to use a game medium of other player in a virtual mission. Hereinafter, the case where a "virtual card" is adopted as the game medium used to play the video game by the player will be described as an example. In this regard, a form of the game medium is not particularly limited. The form of the game medium may be a form in which a mineral (or materials) or a creature (or a living thing) is shown in addition to a form of a general card (for example, a trading card and the like; a form of a square-shaped paper on which a picture is drawn), for example.

Figure 3:
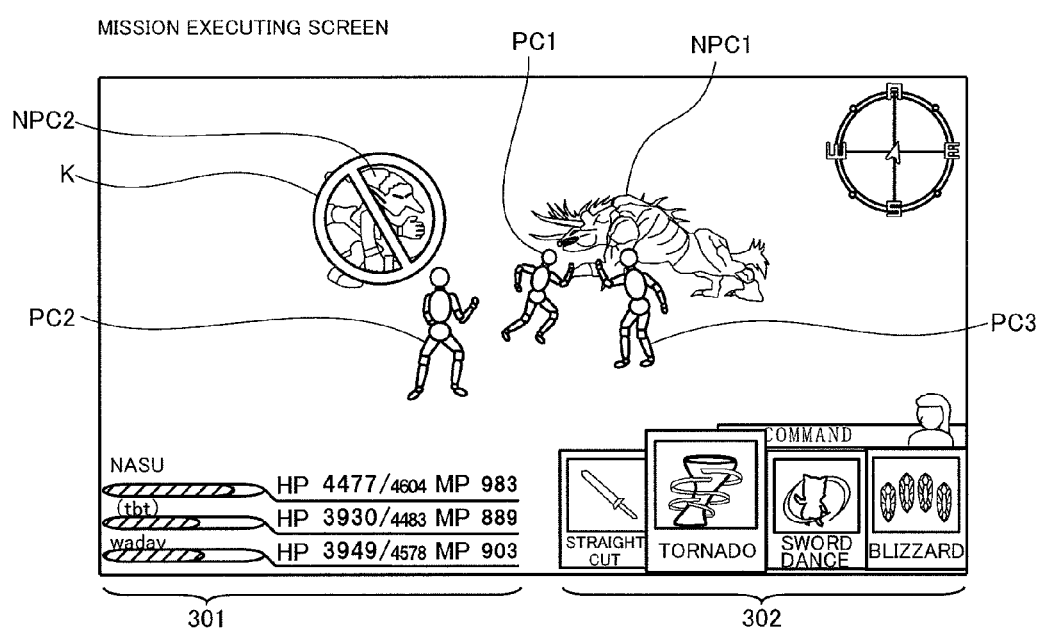
FIG. 3 is an explanatory drawing for explaining a usage mode of virtual cards.

FIG. 3 is an explanatory drawing for explaining a usage mode of virtual cards. More specifically, FIG. 3 shows an example of a game screen (mission executing screen) displayed on the display screen of the user terminal when the player carries out a virtual mission. As shown in FIG. 3, in the present embodiment, a game screen (that is, a battle screen) on which player characters (for example, three player characters PC1 to PC3); enemy characters (for example, two enemy characters NPC1, NPC2) each of which is operated in accordance with a predetermined rule; a status display area 301; and a command card display area 302 are provided is displayed on the mission executing screen during execution of a mission. A status of the player character (for example, an ATB gauge, an HP and an MP) is displayed in the status display area 301. Command cards are selectably displayed in the command card display area 302.

Here, each of the player characters is managed by a virtual card. Namely, the player selects a virtual card (or a character card) in which information on the player character is set up before the start of a mission, whereby the player determines a combination (or a party) of the player characters that participate in a virtual mission. In this regard, in the video game according to the present invention, the character cards are classified broadly into two categories including a virtual card (player card) associated with a specific player and a virtual card (non-player card) associated with a specific player. Further, a player card is classified into any one of a "friend card" and a "guest card" in accordance with a relationship between a player who possesses one or more player card and a player associated with each of the one or more player card. The player who participates in the video game concerns the other player via a virtual card, such as exchange of virtual cards, for example. In this regard, processing related to various kinds of virtual cards will be described later in detail.

Further, the command card is a virtual card for which a command carried out by the player character is set up. When a battle is started, four command cards are distributed to the player and are displayed in the command card display area 302 of the corresponding user terminal. The player selects one command to be used among the four command cards. Then, when an ATB gauge is accumulated to a predetermined amount in accordance with elapse of time, the corresponding player character carries out the selected command. Further, in a case where there is a plurality of command cards (for example, the same command cards), each of which satisfies a predetermined condition, among the four command cards thus distributed, the plurality of command cards is temporarily integrated.

In this regard, FIG. 3 also shows an image K (kill site). The image K indicates that the player character can destroy the enemy character at a single stroke by making an attack on the enemy character in a case where the enemy character meets a predetermined condition. The video game processing system 100 sets up a kill site for the enemy character or the player character in the course of the virtual mission on the basis of the information set up on the virtual card, for example.

In this regard, the configuration of the video game whose progress is controlled by the video game processing system 100 is not limited to this configuration. For example, the video game may be configured so that the player can use a virtual card associated with other player (for example, a display form of a command card and/or an operation method are different from the content described above).

In order to control progress of the video game described above, in the present embodiment, the video game information storage section 16 includes: a virtual mission information storage section 16a; a player information storage section 16b; and a virtual card information storage section 16c (see FIG. 2).

The virtual mission information storage section 16a is a storage medium for storing virtual mission information. The virtual mission information is information on missions (virtual missions) on which the player works on using a virtual card. In the present embodiment, the virtual mission information indicates: a virtual mission provided to the player (that is, a mission imposed on the player in the virtual space); and a privilege to be given to the player who accomplishes the virtual mission (that is, accomplishment privilege).

FIG. 4 is an explanatory drawing showing an example of a storage state of the virtual mission information stored in the virtual mission information storage section 16a. As shown in FIG. 4, the virtual mission information contains: a virtual mission number by which a virtual mission can be specified uniquely; an action power (required action power) that the player consumes in order to work on (or address) the virtual mission; the number of battles that constitutes the virtual mission (continuous battle number); information (enemy character information) on enemy characters that appears during the virtual mission (or may appears during the virtual mission); an experience value that the player can acquire in a case where the virtual mission is accomplished; and an in-game item that the player acquires (or may acquire) in a cases where the virtual mission is accomplished. In this regard, in the present embodiment, the in-game item as the accomplishment privilege includes one linked to an enemy character (for example, a monster) that appears in the virtual mission.

In this regard, the configuration of the virtual mission information is not limited to this configuration. For example, the video game processing system 100 may be configured so that the virtual mission information contains a task other than a battle so long as the virtual mission information contains any task and a privilege for accomplishment of the task.

The player information storage section 16b is a storage medium for storing player information. The player information is information on players who participate in the video game. In the present embodiment, the player information indicates: a status of each of a plurality of players; one or more virtual cards possessed by each of the plurality of players; and other player associated with each of the one or more virtual cards.

FIG. 5 is an explanatory drawing showing an example of a storage state of the player information stored in the player information storage section 16b. As shown in FIG. 5, the player information contains: a player number by which a player can be specified uniquely; and various kinds of statuses of the player. In the present embodiment, the statuses of the player includes: a level of the player in the video game; an action power used to accept a virtual mission; various kinds of points each of which increases or decreases in accordance with progress of the video game; and a virtual card virtually possessed by the player (possessed virtual card).

Here, the various kinds of points include a rescue point, a class point and a friend point.

The rescue point means a point that the player uses in order to carry out a mission to rescue other player (that is, a rescue mission). In the present embodiment, the rescue point has an upper limit of five points, and the reduced rescue point is fully recovered at predetermined timing (for example, once per day).

The class point means a point used to determine a class of the player in accordance with progress of the video game. In the present embodiment, the class point is given to the player as a privilege of accomplishment of the virtual mission.

The friend point means a point used to compose virtual cards by the player. The player is allowed to select and compose a plurality of virtual cards from among the possessed virtual cards by consuming the predetermined amount of friend points. In this regard, the composed virtual card may become other virtual card with different kind, or a level (or other status) of the virtual card itself may increase.

In this regard, the configuration of the player information is not limited to this configuration. For example, the player information may contain various kinds of information regarding the player, containing information indicating a current status of the player, such as the virtual mission that the player is carrying out and a progress status of the virtual mission (player status information) and information indicating a relationship (or connection) between players (for example, information indicating players who are registered as a so-called friend; hereinafter, referred to as "friend information").

The virtual card information storage section 16c is a storage medium for storing virtual card information. The virtual card information is information on virtual cards. In the present embodiment, the virtual card information indicates various kinds of parameters on the virtual cards, including an offensive power and an HP of a character (that is, the player character) that can be operated by the player when to use a player card for a virtual mission.

FIG. 6 is an explanatory drawing showing an example of a storage state of the virtual card information stored in the virtual card information storage section 16c. As shown in FIG. 6, the virtual card information contains: a virtual card number by which a virtual card can be specified uniquely; a type of the virtual card; and various kinds of parameters of the virtual card.

Here, a player card that is a virtual card associated with a specific player and a non-player card that is a virtual card not associated with the specific player are included in the type of the virtual card. In this regard, the language "associated with the player" according to the present embodiment denotes a concept different from the language "possessed by the player", and means a "virtual card indicating the player". The video game processing system 100 may be configured so that association between a player and a player card is changed in accordance with progress of the video game, or the association is not changed in accordance with progress of the video game. In the case of a configuration of the former, the video game processing system 100 may be configured so as to specify one possess virtual card as the player card corresponding to the player among the virtual cards possessed by the player in response to a request from the player, for example. On the other hand, in the case of a configuration of the latter, the video game processing system 100 may be configured so as to unchangeably specify the player card corresponding to each player in accordance with a specific rule, for example.

In this regard, the configuration of the virtual card information is not limited to this configuration. For example, the virtual card information may contain various kinds of information on the virtual cards, such as a parameter according to a level of the virtual card, a change rule of the parameter of the virtual card according to a status of the player (for example, the level), or a rare level of the virtual card.

Each of the plurality of user terminals 21 to 2N is managed by a user (or a player) who carries out the video game, and is configured by a mobile communication terminal, such as a cellular phone terminal, a PDA (Personal Digital Assistants) and a mobile game apparatus, by which the user can play a network delivery-type game, for example. Each of the plurality of user terminals 21 to 2N has hardware (for example, a display device for displaying a game screen, an audio output device and the like) and software to carry out a video game by connecting the user terminal 21 to 2N to the communication network 30 and carrying out communication with the video game processing server 10. In this regard, the video game processing system 100 may be configured so that the plurality of user terminals 21 to 2N can directly communicate with each other without passing through the video game processing server 10.

Next, an operation of the video game processing system 100 according to the present embodiment will be described. In this regard, the content of operations and/or processing with no relationship to the present invention may be omitted.

Figure 7:
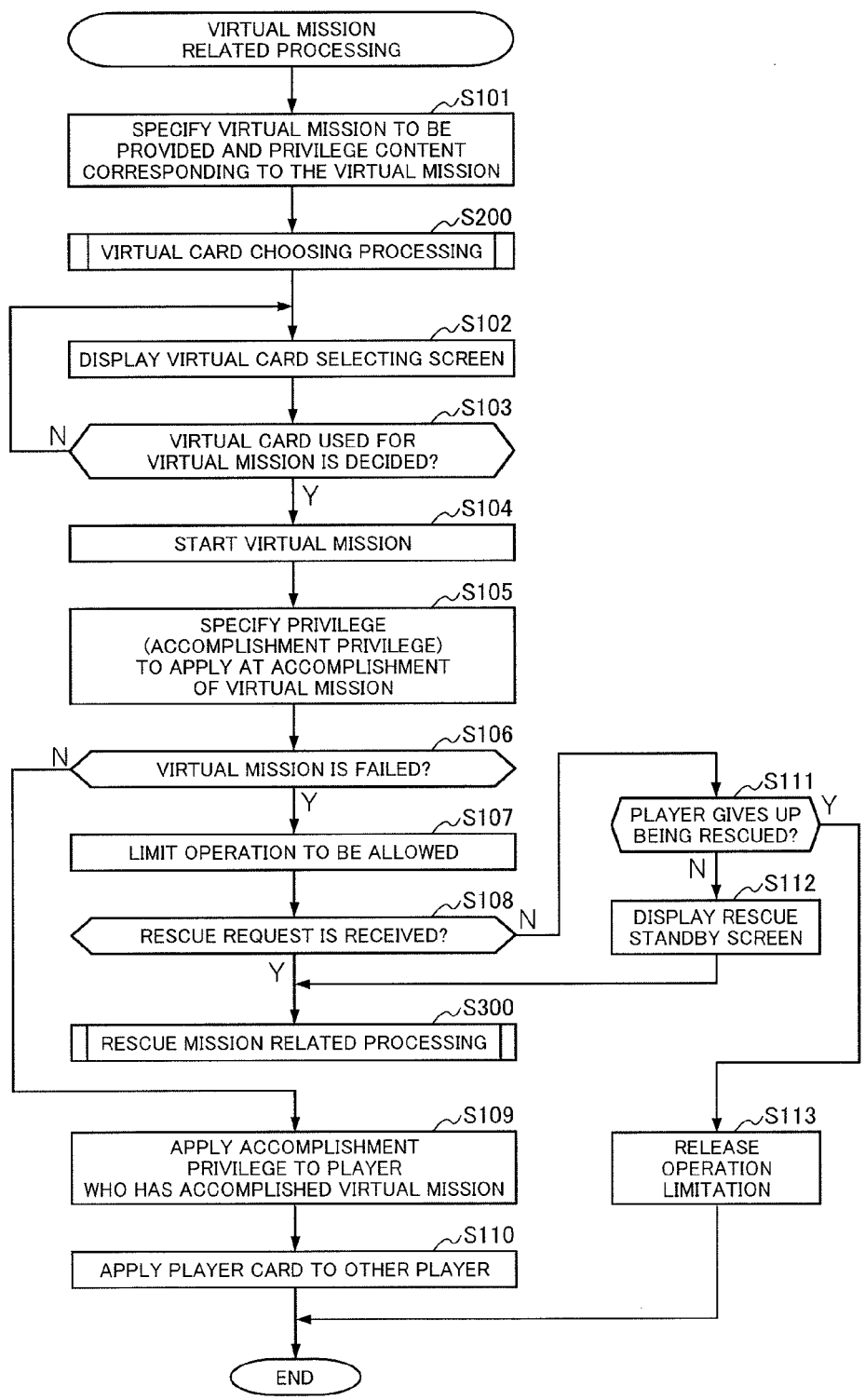
FIG. 7 is a flowchart showing an example of virtual mission related processing.

FIG. 7 is a flowchart showing an example of virtual mission related processing carried out by the video game processing system 100. In the virtual mission related processing, processing from a process to provide a virtual mission to a player to a process to give a player a privilege according to a result of the virtual mission is carried out. Hereinafter, an operation of the video game processing system 100 when to carry out the virtual mission related processing will be described with reference to FIG. 7, which shows a flowchart including processes carried out by each of the plurality of user terminals 21 to 2N and processes carried out by the video game processing server 10.

The virtual mission related processing is started in a case where the video game processing server 10 receives a virtual mission providing request from any of the plurality of user terminals 21 to 2N (hereinafter, the explanation will proceed using a user terminal 21 as an example), for example.

In the virtual mission related processing, the video game processing server 10 first specifies a virtual mission to be provided to a user (that is, a player X1) of the user terminal 21 and the privilege content corresponding to the virtual mission (Step S101). In the present embodiment, when a virtual mission providing request is received by presenting a virtual mission number from the user terminal 21, the video game processing server 10 determines a virtual mission indicated by the virtual mission number as a virtual mission to be provided to the player X1. Further, the video game processing server 10 specifies the content of a privilege set up in advance to the virtual mission (for example, a kind of a privilege, and a condition to give a player the privilege) as the privilege content corresponding to the specified virtual mission.

When the virtual mission to be provided and the privilege content are specified, the video game processing server 10 carries out processing to choose virtual cards from which the player X1 is caused to select (that is, virtual card choosing processing) (Step S200).

Figure 8:
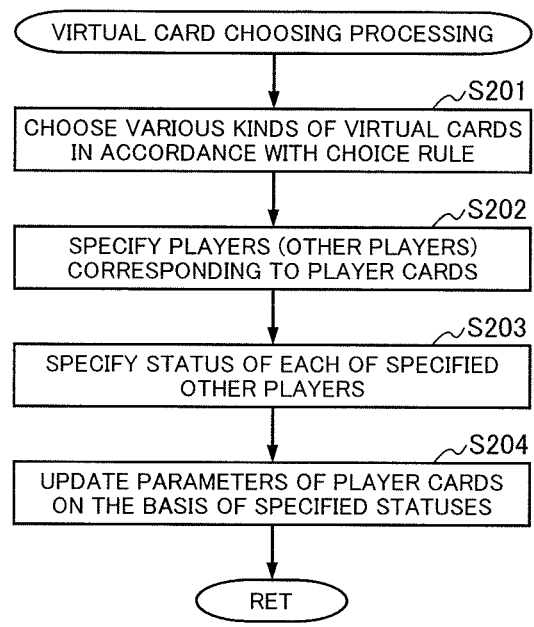
FIG. 8 is a flowchart showing an example of virtual card choosing processing.

FIG. 8 is a flowchart showing an example of virtual card choosing processing carried out by the video game processing server 10. In the virtual card choosing processing, the video game processing server 10 first chooses various kinds of virtual cards in accordance with a predetermined choice rule to match a plurality of virtual cards (Step S201). In the present embodiment, the video game processing server 10 chooses three non-player cards, three friend cards and three guest cards. At this time, the video game processing server 10 excludes the virtual card(s) that the player X1 has used in the virtual mission within a predetermined time (for example, before within three hours from the present) from choice candidates.

The non-player card is a virtual card associated with an important character that appears in the video game. The video game processing server 10 chooses three non-player cards in a random manner from among the virtual cards possessed by the player X1. In this regard, in a case where the number of non-player cards included in the virtual cards possessed by the player X1 is less than the chosen number, the video game processing server 10 chooses only the non-player cards of the number possessed by the player X1. Further, in a case where there is no non-player card in the virtual cards possessed by the player X1, the video game processing server 10 does not carry out choice of the non-player card.

The friend card is a virtual card associated with a player whom the player registered as a friend. The video game processing server 10 acquires log-in time of the player (that is, a friend) corresponding to the friend card possessed by the player X1. In this regard, the log-in time is cached for a few minutes at a client side (in the present embodiment, at the user terminal 21 side). Therefore, by caching the log-in time, the video game processing server 10 allows a load of communication with the user terminal 21 to be reduced. When a log-in time of each of the user terminals 21 to 2N is acquired, the video game processing server 10 creates a list of friends; sorts the user terminals 21 to 2N in log-in order; and chooses friend cards corresponding to the top three user terminals 21 to 2N. In this regard, in the present embodiment, the earlier the user terminal 21 to 2N logs in the video game processing server 10, the more superordinate friend the user terminal 21 to 2N becomes. In this regard, in a case where the number of friend cards included in the virtual cards possessed by the player X1 is less than the choice number, the video game processing server 10 chooses only the virtual cards of the number possessed by the player X1. Further, in a case where there is no friend card in the possessed virtual cards, the video game processing server 10 does not choose any friend card.

The guest card is a virtual card associated with a player corresponding to a player card that the player does not possess and who is not a friend of the player. The video game processing server 10 extracts three users who are players each of which level is at the same as the level of the player X1 (for example, within five levels above and below the level of the player X1) and log in the video game processing server 10 within a specific time (for example, within before three hours from the present time) among all of the players, and chooses three player cards corresponding to the extracted three players as guest cards.

When the virtual cards are chosen, the video game processing server 10 specifies players (other players) respectively corresponding to the chosen player cards (Step S202). Hereinafter, the case where the video game processing server 10 specifies a user X2 (other player X2) of a user terminal 22 as other player will be described as an example.

When the other players are specified, the video game processing server 10 specifies a status of each of the specified other players (Step S203). In the present embodiment, the video game processing server 10 specifies a level of the other player X2 by referring to the player information thereof.

When the status of the other player X2 is specified, the video game processing server 10 updates parameters (for example, an offensive power and an HP) of the player card corresponding to the other player X2 on the basis of the specified status of the other player X2 (Step S204). In this regard, in the present embodiment, the video game processing server 10 also updates a parameter of the chosen guest card in the same manner. On the other hand, as for the chosen non-player card, the video game processing server 10 updates a parameter thereof on the basis of the status (for example, a level) of the player X1. In this regard, the method of determining a parameter of the non-player card is not limited to this method. The video game processing system 100 may be configured so that the parameter is updated by other processing than that for the player card (including the friend card and the guest card) or a predetermined parameter is used without updating.

When the virtual card is chosen and a parameter of the chosen virtual card is updated if necessary, the video game processing server 10 shifts to a process at Step S102 in the virtual mission related processing (see FIG. 7).

When the video game processing server 10 carries out the virtual card choosing processing, the user terminal 21 displays a virtual card selecting screen (Step S102). In the present embodiment, the user terminal 21 receives virtual card information, which indicates the virtual cards chosen in the virtual card choosing processing, from the video game processing server 10, and displays the content of the virtual card information on the virtual card selecting screen.

Figure 9:
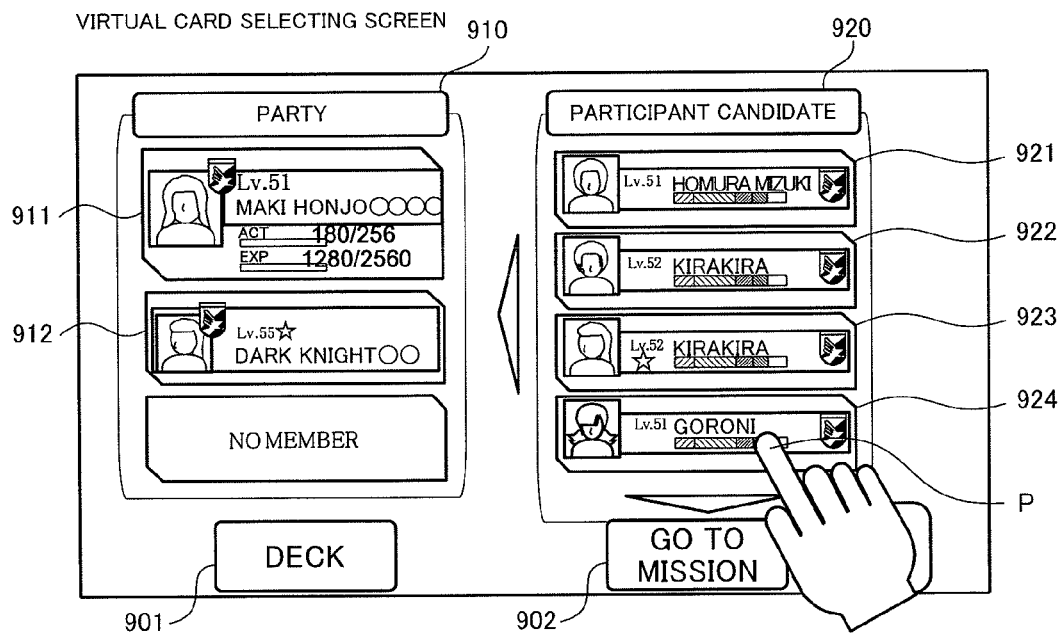
FIG. 9 is an explanatory drawing for explaining a virtual card selecting screen.

FIG. 9 is an explanatory drawing for explaining the virtual card selecting screen. As shown in FIG. 9, a deck button 901; a mission button 902 for receiving a request to start the virtual mission; a party display area 910; and a participant candidate display area 920; are provided on the virtual card selecting screen according to the present embodiment. The party display area 910 shows members (or parties) that participate in the virtual mission. The participant candidate display area 920 shows participant candidates for the virtual mission. The user terminal 21 selectably displays at least part of the content of the virtual card information received from the video game processing server 10 in the participant candidate display area 920.

The deck button 901 is a virtual button used for receiving a request to display a deck editing screen. For example, in a case where a display position of the deck button 901 is pressed (or touched) by means of a finger P of the player X1, the user terminal 21 displays the deck editing screen (not shown in the drawings). A set of command cards (deck) respectively set up to members that belong to a party (characters respectively indicated by the virtual cards) is display on the deck editing screen.

A plurality of images 911, 912 and 921 to 924 (hereinafter, referred to appropriately as the "virtual cards 911, 912 and 921 to 924") is respectively displayed in the party display area 910 and the participant candidate display area 920. The plurality of images 911, 912 and 921 to 924 indicates information that becomes the criterion for a selection of the virtual card by the player X1, such as an image of a character indicated by the virtual card, a level of a player corresponding to the virtual card, and a gauge showing an attribute of a command card associated with the virtual card, on the basis of the virtual card information. Further, in the present embodiment, an identification image (for example, a star-shaped image shown in FIG. 9; see virtual card 912, 923) is displayed on the virtual card (friend card) corresponding to a friend of the player X1 so as to be capable of identifying the friend card from the other virtual cards. When a selection of one virtual card displayed in the participant candidate display area 920 is received, the user terminal 21 moves the virtual card for which the selection is received into the party display area 910. Further, when a selection of the virtual card displayed in the party display area 910 is received, the user terminal 21 displays the virtual card, for which the selection is received, in the participant candidate display area 920.

When the virtual card selecting screen is displayed, the user terminal 21 determines whether a virtual card used for the virtual mission is decided or not (Step S103). In the present embodiment, the user terminal 21 determines that the virtual card used for the virtual mission is decided in a case where a selection of the mission button 902 is received in a state where virtual cards of a predetermined number (for example, three) are displayed in the party display area 910.

Here, in a case where it is determined that the virtual card used for the virtual mission is decided ("Yes" at Step S103), the user terminal 21 starts the virtual mission (Step S104). In the present embodiment, the user terminal 21 starts the virtual mission by displaying a start screen of the virtual mission on basis of the virtual mission information received together with the virtual card information, for example.

When the virtual mission is started, the user terminal 21 specifies a privilege (accomplishment privilege) to apply to the player X1 at accomplishment of the virtual mission (Step S105). In the present embodiment, the user terminal 21 specifies the accomplishment privilege in accordance with the privilege content set up in advance to the virtual mission and an accomplishment status of the virtual mission by the player X1 (for example, a kind of each of defeated enemy characters and the number of the defeated enemy characters). Further, in the present embodiment, the user terminal 21 specifies, at this time, a player card corresponding to the player X1 as a privilege (used privilege) to be given to the other player X2 corresponding to the player card used by the player X1. In this regard, in a case where the player who works on the virtual mission satisfies a predetermined delivery condition (for example, acquisition of the privilege according to the virtual mission), the used privilege is given to the other player X2 by means of the video game processing server 10. Further, timing to specify the accomplishment privilege and the used privilege is not particularly limited. For example, the video game processing system 100 may be configured so that the accomplishment privilege and the used privilege is specified any one of at the start of the virtual mission, during the virtual mission (for example, when the condition to give the accomplishment privilege is satisfied, and the like), and at the end of the virtual mission. Further, the video game processing system 100 may be configured so that each of the privileges is specified independently.

When accomplishment privilege is specified, the user terminal 21 determines whether the player X1 fails the virtual mission or not (Step S106). In the present embodiment, the user terminal 21 controls progress of the virtual mission on the basis of an operational input by the player X1 after the start of the virtual mission. As a result, the user terminal 21 determines that the player X1 fails the virtual mission when an HP of a party satisfies a predetermined condition (for example, when the HP of each of all characters belonging to the party becomes zero).

Here, in a case where it is determined that the player X1 does not fail the virtual mission, for example, because the player X1 accomplishes the virtual mission ("No" at Step S106), the user terminal 21 shifts to a process at Step S109 (will be described later). On the other hand, in a case where it is determined that the player X1 fails the virtual mission ("Yes" at Step S106), the user terminal 21 limits the operation to be allowed to the player to the predetermined content (Step S107). In the present embodiment, the user terminal 21 determines that a present state of the player X1 is a rescue required state, and does not allow the player to select an operation (for example, a selection operation of a virtual mission and the like) that is allowed to select at a normal state.

When the operation to be allowed to the player is limited, the user terminal 21 determines whether a rescue request is received or not (Step S108). In the present embodiment, the user terminal 21 determines whether a rescue request is received or not by displaying a predetermined rescue request receiving screen in a case where it is determined that the player fails the virtual mission. In this regard, a method of receiving a rescue request is not limited to this method. For example, the video game processing system 100 may be configured so that, in a case where it is determined that the player failed the virtual mission, the user terminal 21 determines that the rescue request is received.

Figure 10:
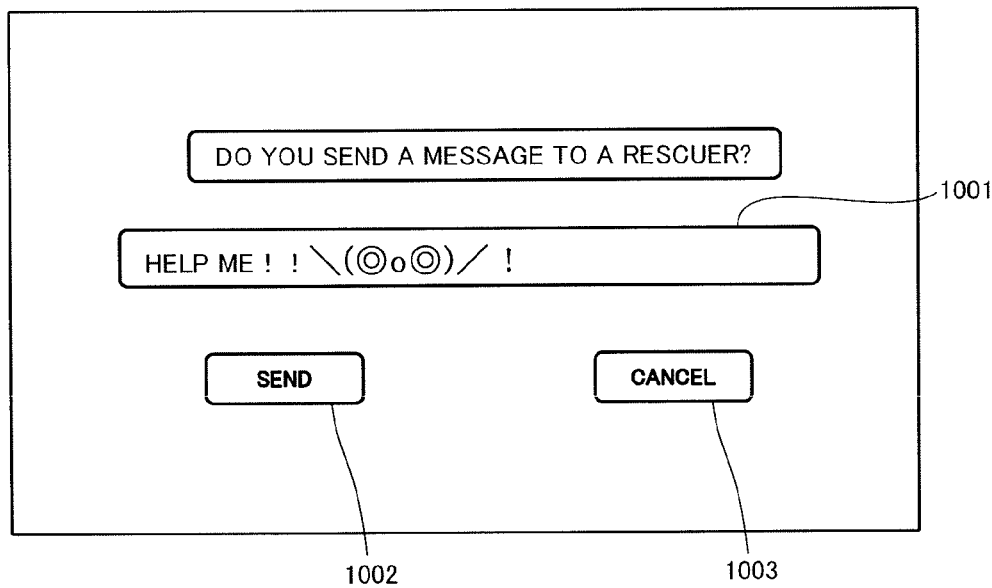
FIG. 10 is an explanatory drawing for explaining an example of a rescue request receiving screen.

FIG. 10 is an explanatory drawing for explaining an example of a rescue request receiving screen. As shown in FIG. 10, a message input area 1001 for receiving an input for a rescue request message from the player; a send button 1002 for receiving a request to send the rescue request message from the player; and a cancel button 1003 for receiving a request to cancel transmission of the rescue request message are provided on the rescue request receiving screen.

Here, in a case where it is determined that a rescue request is received because selection of the send button 1002 is received ("Yes" at Step S108), the user terminal 21 causes the video game processing server 10 to carry out rescue mission related processing (Step S300).

Figure 11:
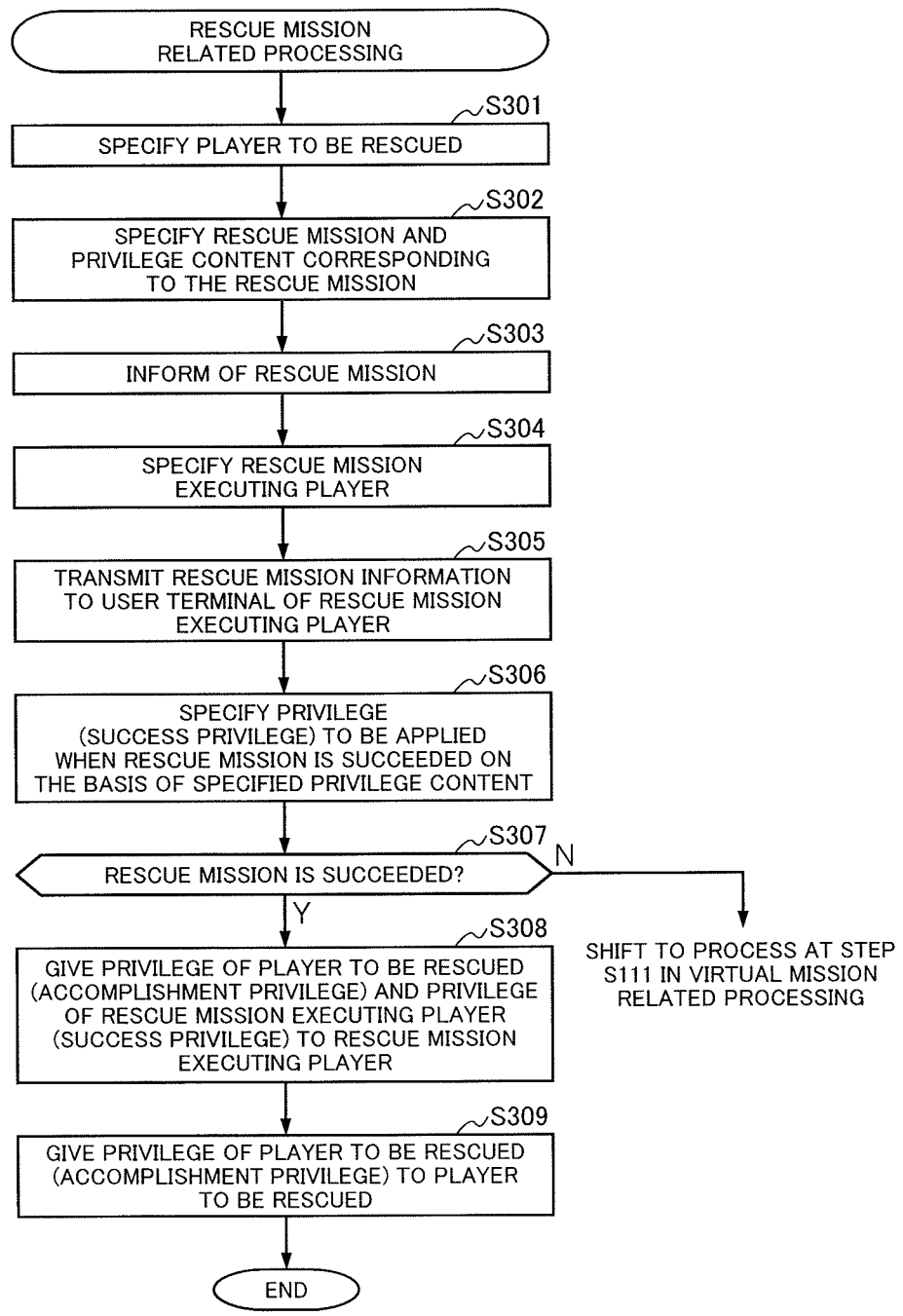
FIG. 11 is a flowchart showing an example of rescue mission related processing.

FIG. 11 is a flowchart showing an example of the rescue mission related processing carried out by the video game processing server 10. In the rescue mission related processing, the video game processing server 10 first specifies a player to be rescued (Step S301). In the present embodiment, when the video game processing server 10 receives a rescue request message from the user terminal 21, the video game processing server 10 specifies the player X1 as a player to be rescued.

When the player to be rescued is specified, the video game processing server 10 specifies the rescue mission and the privilege content corresponding to the rescue mission (Step S302). In the present embodiment, the video game processing server 10 specifies the virtual mission that the player X1 failed as a rescue mission. Further, the video game processing server 10 specifies, as the privilege content corresponding to the specified rescue mission, an in-game item and a condition to give the in-game item in accordance with the content of the specified rescue mission (for example, a kind of the enemy character that appears in the failed virtual mission).

When the rescue mission and the privilege content are specified, the video game processing server 10 informs the other player of the rescue mission (Step S303). In the present embodiment, the video game processing server 10 informs of the rescue mission the player who satisfies a predetermined condition (for example, a condition that a difference of players' levels is within three) in a relationship with the player X1. In this regard, the video game processing system 100 may be configured so that an action of one player A to sequentially rescue other player B is restricted by providing a specified time limit as the predetermined condition (for example, within 12 hours). Further, the video game processing system 100 may be configured so that the video game processing server 10 chooses other condition (for example, a player near a predetermined condition) until the number of players reaches a predetermined number in a case where the number of players who satisfy the predetermined condition is less than the predetermined number. Hereinafter, the case where the video game processing server 10 informs a plurality of players including the player X2 of a rescue mission will be described as an example.

When the plurality of players is informed of the rescue mission, the video game processing server 10 specifies a rescue mission executing player who is to carry out the rescue mission (that is, the player who wants to carry out the informed rescue mission) (Step S304). In the present embodiment, in a case where a rescue mission execution request is received from the user terminal 22, the video game processing server 10 specifies the player X2 who is a user of the user terminal 22 as a rescue mission executing player, for example. In this regard, the user terminal 22 displays a predetermined rescue mission selecting screen in a case where the user terminal 22 is informed of a rescue mission from the video game processing server 10 (more specifically, in a case where information indicating existence of the rescue mission is received). Then, in a case where an operational input onto the rescue mission selecting screen is received from the player X2, the user terminal 22 transmits a rescue mission execution request according to the received operational input to the video game processing server 10.

Figure 12:
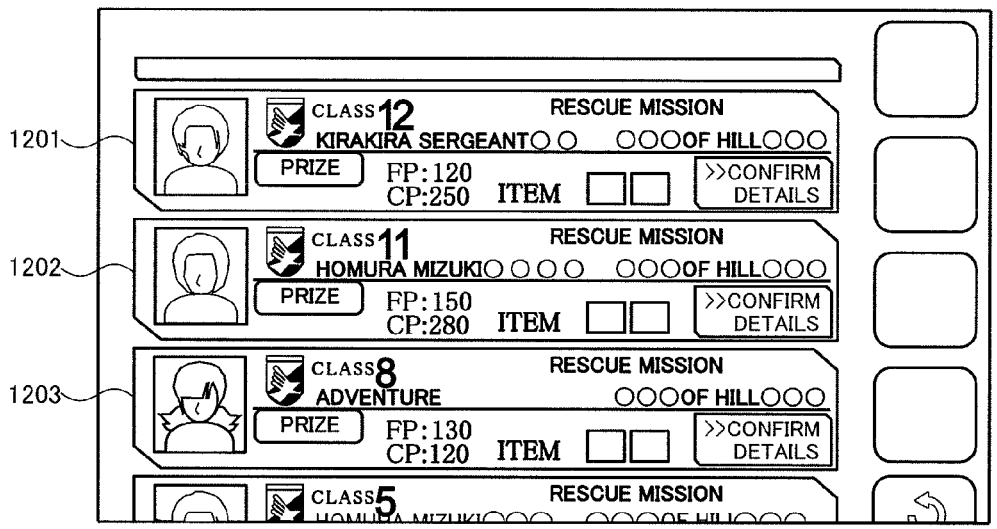
FIG. 12 is an explanatory drawing for explaining an example of a rescue mission selecting screen.

FIG. 12 is an explanatory drawing for explaining an example of the rescue mission selecting screen. As shown in FIG. 12, a rescue applicant list display area is provided on the rescue mission selecting screen. A list of the players to be rescued (hereinafter, referred to as a "rescue applicant list") is displayed in the rescue applicant list display area. The player X2 selects a rescue mission to be undertaken among a plurality of players to be rescued 1201 to 1203 shown in the rescue applicant list using a class of the player to be rescued and a rescue mission name as criteria (judgment standards), for example.

When the player X2 is specified as the rescue mission executing player, the video game processing server 10 transmits (sends) rescue mission information to the user terminal 22 operated by the player X2 (Step S305). In this regard, in the present embodiment, the video game processing server 10 subtracts a rescue point according to execution of the rescue mission from the rescue point of the player X2 at this time. Namely, the video game processing server 10 does not provide a rescue mission to players whose rescue point does not reach the required amount to undertake the rescue mission even though a rescue mission execution request is received. However, in the present embodiment, the video game processing server 10 informs even the player who does not have a rescue point required to undertake the rescue mission of the specified rescue mission. By configuring the video game processing system 100 in this manner, the player is allowed to confirm the content of a rescue mission and to decide whether to undertake the rescue mission or not. For that reason, by configuring the video game processing system 100 so that the player can acquire a rescue point in accordance with progress of the video game, it is possible to motivate the player who confirmed the rescue mission to play the video game. Further, the video game processing system 100 may be configured so that the video game processing server 10 restricts the subject to be informed of the rescue mission in accordance with a progress status of the video game (for example, the amount of the possessed rescue point). By configuring the video game processing system 100 in this manner, it is possible to prevent a load on the video game processing server 10 from excessively increasing due to an increase of communication targets.

When the rescue mission information is received from the video game processing server 10, the user terminal 22 carries out processing to cause the player X2 to play the rescue mission on the basis of the received rescue mission information. In this regard, the video game processing system 100 may be configured so that, as the processing to cause a player to play a rescue mission, a rescue request is received in accordance with failure of the rescue mission in the same manner as the virtual mission.

On the other hand, the user terminal 21 operated by the player X1, who has been specified as a player to be rescued, restricts any operation regarding the virtual mission by the player X1. In the present embodiment, the user terminal 21 displays a game screen (or a rescue standby screen) for showing the player X1 a situation in which the player X1 is waiting for rescue and cannot carry out any operation other than an "operation to give up being rescued".

Figure 13:
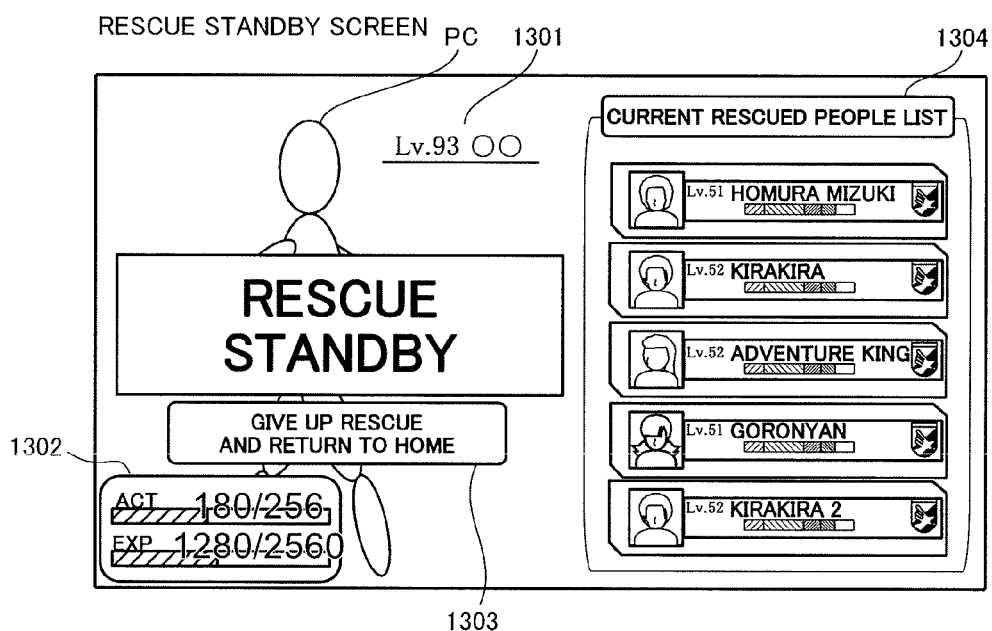
FIG. 13 is an explanatory drawing for explaining an example of a rescue standby screen.

FIG. 13 is an explanatory drawing for explaining an example of the rescue standby screen. As shown in FIG. 13, a character PC (player character PC) indicated by a virtual card corresponding to a player; a player status display area in which a level 1301 of the player and a status 1302 of the player are displayed; a release button 1303 for receiving a release request of a rescue standby state from the player; and a current rescued people list display area 1304 in which a list of other players who carry out the rescue mission in response to the rescue request by the player is displayed; are provided on the rescue standby screen. In this regard, in the present embodiment, in order to confirm a rescue state of the player X1, the user terminal 21 confirms a progress status of the rescue mission with the video game processing server 10 at predetermined time intervals (for example, every one minute) during display of the rescue standby screen.

When the user terminal 21 sends the rescue mission information in the rescue mission related processing, the video game processing server 10 specifies, on the basis of the specified privilege content, a privilege (success privilege) to be given to the rescue mission executing player when the rescue mission is succeeded (In order to clarify the explanation, "accomplishment of a rescue mission" is expressed as "success". The same applies hereinafter.) (Step S306). In the present embodiment, the video game processing server 10 specifies a success privilege by comparing a progress status of the rescue virtual mission by the player X2 (for example, a kind of each of defeated enemy characters and the number of the defeated enemy characters) with the privilege content (for example, a condition to give an in-game item). More specifically, the video game processing server 10 specifies, for the player who succeeded the rescue, the class point, the friend point and the success privilege including the other drop reward (that is, a reward given to the player who succeeded the virtual mission). Further, in the present embodiment, the video game processing server 10 specifies the content of the success privilege in accordance with a success privilege determination rule on which a relationship between the rescued player and the rescuing player (for example, a difference of their levels, and whether the players are friends or not, and the like) influences. In this regard, the success privilege determination rule may be configured so that: the class point becomes higher than the case of normal rescue when the player rescued other player whose level is lower than the level of the player; and the class point becomes higher than the normal rescue when the player rescued a friend of the player. Further, the success privilege determination rule may also be configured so that a command card or an equipment material that the player can acquire via only the rescue is specified. In this regard, timing to specify the success privilege is not particularly limited. For example, the timing may be any one of at the start of the rescue mission, during the rescue mission (for example, when the condition to give the success privilege is satisfied, and the like), and at the end of the rescue mission.

When the success privilege is specified, the video game processing server 10 determines whether the rescue mission indicated by the transmitted rescue mission information is succeeded or not (Step S307). In the present embodiment, the video game processing server 10 receives information indicating a result of the rescue mission (rescue mission result information) from the user terminal 22, and determines whether the rescue mission is succeeded or not on the basis of the received rescue mission result information.

Here, in a case where it is determined that the rescue mission is succeeded ("Yes" at Step S307), the video game processing server 10 gives a privilege of the player to be rescued (in the present embodiment, the accomplishment privilege) and a privilege of the rescue mission executing player (in the present embodiment, the success privilege) to the rescue mission executing player (Step S308). In this regard, the video game processing system 100 may be configured so as to give only the success privilege to the player who succeeded the rescue mission. Further, the video game processing system 100 may be configured so that, in a case where the player who succeeded the rescue mission used the friend card in the rescue mission, the video game processing server 10 gives the player card corresponding to the player who succeeded the rescue mission and/or the player card corresponding to the player to be rescued to the player corresponding to the friend card.

When the privileges (in the present embodiment, the accomplishment privilege and the success privilege) are given to the rescue mission executing player, the video game processing server 10 gives the privilege of the player to be rescued (in the present embodiment, the accomplishment privilege) to the player to be rescued (Step S309), and terminates the processing herein. In this regard, in the present embodiment, in a case where the player fails the virtual mission, a friend card (that is, a virtual card corresponding to the player who failed the virtual mission) is not given to the player corresponding to the friend card used by the player. However, the video game processing system 100 may be configured so that, in a case where the rescue mission is succeeded, the video game processing server 10 gives the player card corresponding to the player to be rescued and/or the player card corresponding to the player who succeeded the rescue mission to the player corresponding to the friend card.

Further, in a case where it is determined in the process at Step S106 in the virtual mission related processing that the player does not fail the virtual mission, for example, because the player X1 accomplishes the virtual mission ("No" at Step S106), the video game processing server 10 gives the specified accomplishment privilege to the player X1 who has accomplished the virtual mission (Step S109). In the present embodiment, the video game processing server 10 causes the user terminal 21 operated by the rescued player X1 to display a predetermined mission result display screen, and causes the user terminal 22 operated by the rescuing player X2 to display a predetermined rescue result display screen (not shown in the drawings). In this regard, the video game processing server 10 appropriately updates various kinds of information stored in the video game information storage section 16 when to give the privilege or before or after the privilege is given. In the present embodiment, the video game processing server 10 leaves a completion flag of the virtual mission at the rescued player side. Namely, unless the player accomplishes the virtual mission by himself or herself, the completion flag of the virtual mission cannot be reset.

Figure 14:
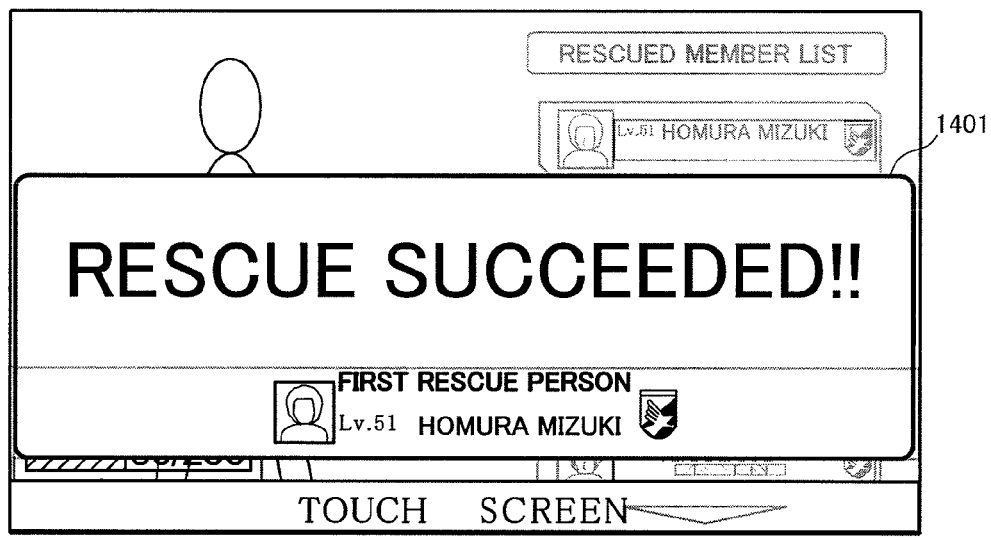
FIG. 14 is an explanatory drawing for explaining a mission result display screen.

FIG. 14 is an explanatory drawing for explaining a mission result display screen. As shown in FIG. 14, the user terminal 21 pop-up displays an image 1401 that indicates to be rescued on the rescue standby screen.

Figure 15:
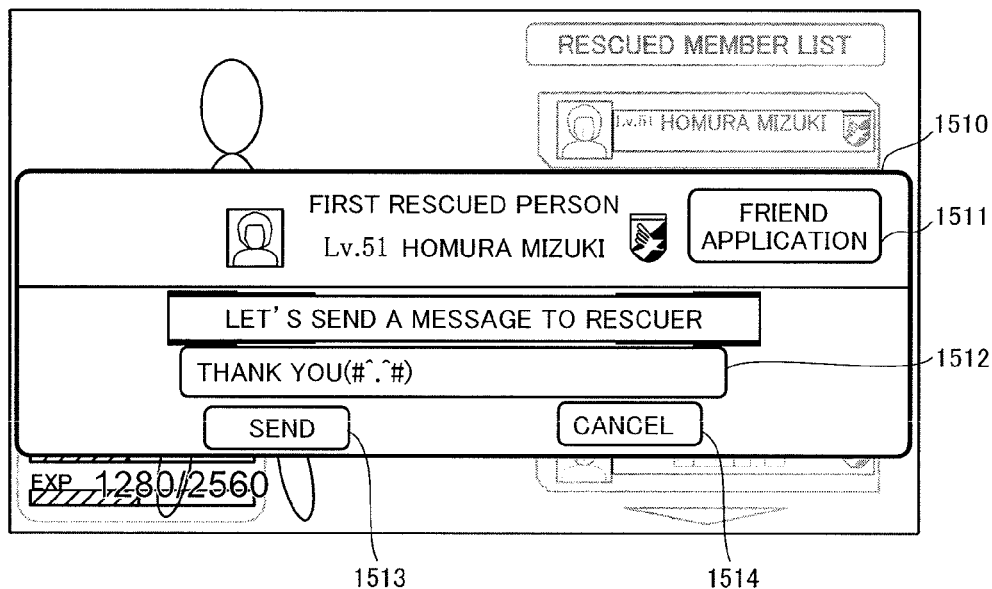
FIG. 15 is an explanatory drawing for explaining another example of the mission result display screen.

FIG. 15 is an explanatory drawing for explaining another example of the mission result display screen. As shown in FIG. 15, the video game processing system 100 may be configured so that an image 1510 to promote (or encourage) the player X1 thus rescued to carry out a predetermined operational input is displayed on the mission result display screen. In this case, the video game processing system 100 may be configured so that information on the player who succeeded the rescue mission, a friend application button 1511 for receiving a friend application request to the player, a reward message input area 1512 for receiving an input of a reward message for the player, a send button 1513 for receiving a request to send the reward message, and a cancel button 1514 for receiving a request to cancel the transmission of the reward message are provided in the image 1510.

When the accomplishment privilege is given, the video game processing server 10 gives the player card corresponding to the player X1 to other player (that is, a player corresponding to the friend card that the player X1 uses in the virtual mission) (Step S110), and terminates the processing herein.

In this regard, in a case where it is determined in the process at Step S108 in the virtual mission related processing that no rescue request is received, for example, because the user terminal 21 receives the selection of the cancel button 1003 on the rescue request receiving screen ("No" at Step S108), or in a case where the video game processing server 10 determines in the process at Step S307 in the virtual mission related processing that the rescue mission is not succeeded, for example, because the player X2 fails the rescue mission or the player X1 has not been rescued for a fixed period by anybody ("No" at Step S307), the user terminal 21 determines whether the player X1 gives up being rescued or not (Step S111). In the present embodiment, the user terminal 21 determines that the player X1 gives up being rescued in a case where a selection of the release button 1303 on the rescue standby screen is received. Namely, in the present embodiment, whether the player to be rescued gives up being rescued or not is not related to execution or non-execution of the rescue. In this regard, in the present embodiment, a predetermined amount of class points is consumed for the selection of the release button 1303.

Here, in a case where it is determined that the player X1 does not give up being rescued ("No" at Step S111), the user terminal 21 displays the rescue standby screen (see FIG. 13) (Step S112), and shifts to a process at Step S300. On the other hand, in a case where it is determined that the player X1 gives up being rescued because the selection of the release button 1303 is received ("Yes" at Step S111), the user terminal 21 releases the limitation of the operation to be allowed to the player (see Step S107) (Step S113), and terminates the processing herein. In this regard, the video game processing apparatus 100 may be configured so that the video game processing server 10 carries out processing defined in advance for the case where the player to be rescued gives up being rescued (rescue mission suspension process) at this time. In this case, the rescue mission suspension process may be configured so that the rescue mission executing player is allowed to recognize that the player to be rescued is rescued. For example, the video game processing apparatus 100 may be configured so that the video game processing server 10 carries out notification to suspend the rescue mission to the player who is carrying out the rescue mission. Alternatively, the video game processing apparatus 100 may be configured so that the video game processing server 10 causes the rescue mission executing player to select whether the rescue mission is to be continued as a virtual mission (that is, as a mission in which there is no rescue target) or not. Further, the video game processing system 100 may be configured so that, in a case where there is a player who is carrying out a rescue mission, the user terminal 21 does not receive a selection of the release button 1303 until a specific time (for example, one hour) elapses from the time when a rescue request was carried out.

As explained above, in the embodiment described above, the video game processing apparatus (for example, the video game processing server 10, the user terminal 21 or the video game processing system 100; The same applies hereinafter.) for controlling progress of the multiplayer participatory video game played using the game medium (for example, the virtual cards) in which parameters are set up is configured so as to: include the virtual mission information storage section 16a for storing virtual mission information, the virtual mission information being information on virtual missions, a player of the video game processing apparatus working on one of the virtual missions using the game medium; provide the virtual mission to the player X1 on the basis of the virtual mission information (for example, Step S104); and give other player X2 a game medium associated with the player X1 using the game medium, the other player X2 being associated with the game medium used in the virtual mission (for example, Step S110). Therefore, it is possible to provide a feeling to cooperate with other player to each player.

Namely, it is possible to increase opportunities that one player uses a game medium of other player. Therefore, it is possible to provide a feeling to cooperate with other player to each player.

Further, in the embodiment described above, the video game processing apparatus may be configured so as to: include the player information storage section 16b for storing player information, the player information indicating a status (for example, the level) of each of a plurality of players, a game medium (for example, the virtual cards)

possessed by each of the plurality of players and other player associated with the game medium; specify, at predetermined timing, a status of the other player corresponding to the game medium possessed by the player X1 (for example, Step S203); and update one or more predetermined parameter (for example, an offensive power and an HP) on the basis of the status of the other player specified, the one or more predetermined parameter being set up in the game medium (for example, Step S204). Therefore, it becomes possible for each player to recognize that his or her own current status influences on the other player who uses the game medium associated with the player. In addition, it is possible to cause the player to recognize that a current status of the other player influences on the player in a case of using the game medium associated with the other player.

Further, in the embodiment described above, the video game processing apparatus may be configured so as to: selectably display the game medium (for example, the virtual cards) (for example, Step S102); and display the game medium together with at least a part of one or more updated parameter (for example, the level of the virtual card) (for example, see FIG. 9) in a case where the parameter updater updated the one or more parameter of the game medium (for example, Step S204). Therefore, it is possible to update the information of the game medium, possessed by the player, corresponding to the other player when the player selects the game medium or the like.

Further, in the embodiment described above, the video game processing apparatus may be configured so as to: specify the player X1 who fails the provided virtual mission as a player to be rescued (for example, Step S301); specify the rescue mission to be accomplish in order to rescue the player X1 to be rescued on the basis of the virtual mission information (for example, Step S302); inform the plurality of players of the rescue mission (for example, Step S303); specify a rescue mission executing player, the rescue mission executing player being a player who carries out the rescue mission (for example, Step S304); provide the rescue mission to the specified rescue mission executing player X2 (for example, Step S305); and give the game medium (for example, virtual card) associated with the player X1 to be rescued to the rescue mission executing player X2 who succeeded the rescue mission (for example, Step S308, S309). Therefore, it is possible for one player to increase an opportunity to acquire a game medium of other player.

In this regard, although it has not been mentioned particularly in the embodiment described above, the video game processing apparatus may be configured so as to: include a game medium information memory (for example, the virtual card information storage section 16c) for storing game medium information, the game medium information containing information on the game medium (for example, the virtual card), the information on the game medium containing information on a player associated game medium (for example, the player card) and information on a non-associated game medium (for example, the non-player card), the player associated game medium being a game medium associated with a specific player, the non-associated game medium being a game medium not associated with the specific player; receive a selection of a multiplayer associated game medium from the player; determine a non-associated game medium in accordance with a predetermined rule (for example, a rule in which virtual cards to be composed are determined in accordance with a combination of virtual cards), the non-associated game medium corresponding to the multiplayer associated game medium selected by the player; and give the player the determined non-associated game medium. By configuring the video game processing apparatus in this manner, it is possible to promote each player to interact (or have contact) with more players (for example, usage of a player associated game medium corresponding to other player, and an acceptance (or reception) of a mission to rescue other player). Further, the video game processing apparatus may be configured so as to erase, when a non-associated game medium, which is determined in a case where the multiplayer associated game medium is selected by the player, is given to the player, the selected multiplayer associated game medium from the game medium possessed by the player (for example, erases the corresponding virtual card from a list of the possessed virtual cards in the player information). By configuring the video game processing apparatus in this manner, it becomes possible to promote each player to interact (or have contact) with more players.

Further, in the embodiment described above, the video game processing apparatus may be configured so as also to give the privilege to the rescued player X1 in a case where the rescue mission is succeeded. Therefore, it is possible to promote the rescued player to rescue the other player. Further, the video game processing apparatus may be configured so as to give a point (for example, a class point), which becomes an evaluation index of the player in a virtual space, to the player who rescued other player as a privilege in accordance with a degree of difficulty of the rescue mission and the like, for example. By configuring the video game processing apparatus in this manner, it is possible to provide, to the player, a virtual space in which an action performed for other player is to be evaluated.

Further, in the embodiment described above, the video game processing apparatus may be configured so as to determine the privilege content (for example, a type of a privilege and a condition to give the privilege) before the player starts the virtual mission (including a rescue mission) (for example, Steps S101, S302). Therefore, it is possible to prevent the player from carrying out a cheat action. Namely, for example, even though a cheat to wrongfully change or revise a parameter of a game medium and the like are carried out by a player, the player cannot acquire an unjustly expensive privilege compared with the degree of difficulty of the accomplished virtual mission or the like. Therefore, this is beneficial.

Further, in the embodiment described above, each of the plurality of user terminals 21 to 2N and the video game processing server 10 carries out the various kinds of processes described above in accordance with various kinds of control programs (for example, the video game processing program) stored in a storage device included in its own apparatus (the user terminal 21 to 2N or video game processing server 10).

In this regard, the configuration of the video game processing system 100 is not limited to the configuration described above. For example, the video game processing system 100 may be configured so that part or all of the processing explained as the processing carried out by any user terminal is carried out by the video game processing server 10. Alternatively, the video game processing system 100 may also be configured so that anyone of the plurality of user terminals 21 to 2N (for example, the user terminal 21) carries out part or all of the processing explained as the processing carried out by the video game processing server 10. Further, the video game processing system 100 may be configured so that the user terminal 21 to 2N includes a part or all of the storage sections included in the video game processing server 10. Namely, the video game processing system 100 may be configured so that a part or all of the functions that any one of the user terminal 21 to 2N and the video game processing server 10 in the video game processing system 100 is included in the other one.

Second Embodiment

Figure 16:
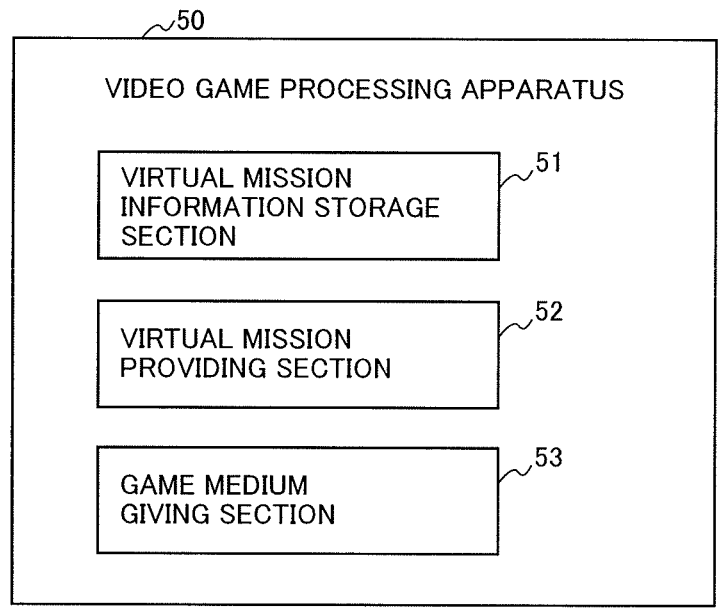
FIG. 16 is a block diagram showing a configuration example of a video game processing apparatus corresponding to at least one of the embodiments of the present invention.

FIG. 16 is a block diagram showing an example of a configuration of a video game processing apparatus 50 (apparatus 50) according to one embodiment of the present invention. In the present embodiment, the apparatus 50 at least has a virtual mission information storage section 51, a virtual mission providing section 52 and a game medium giving section 53.

The apparatus 50 has a function to control progress of a multiplayer participatory video game played using a game medium in which parameters are set up. Although a configuration of the apparatus 50 for controlling progress of a multiplayer participatory video game is not particularly limited, the apparatus is preferably configured to allow each player to simultaneously play a video game. The configuration of the apparatus 50 for controlling progress of a multiplayer participatory video game is, for example, a configuration to control progress of a multiplayer participatory video game by performing communication between the apparatus 50 and another apparatus employing the same configuration as that of the apparatus 50. Further, another configuration is, for example, a configuration to control progress of a multiplayer participatory video game by causing the apparatus 50 to function as a server which communicates with a plurality of terminals.

The virtual mission information storage section 51 has a function to store virtual mission information which is information on a virtual mission which a player works on using a game medium.

Here, the virtual mission means a task placed on a player according to progress of a video game. In this regard, although the content of a task is not particularly limited, the content preferably can only be achieved by using a game medium.

The virtual mission providing section 52 has a function to provide a virtual mission to a player on the basis of virtual mission information.

Here, providing a virtual mission means placing a virtual mission on a player. Although a configuration to provide a virtual mission is not particularly limited, the configuration preferably allows a player to learn the content of the virtual mission placed on the player. The configuration to provide a virtual mission to a player is, for example, a configuration to inform the player of the content of a virtual mission which satisfies condition to be provided with the player, and associate and store identification information of the virtual mission and identification information of the player.

The game medium giving section 53 has a function to give a game medium which is associated with a player using the game medium, to other player associated with the game medium used in a virtual mission.

Here, giving a game medium to a player means showing that the player possesses the game medium. A configuration to give a game medium to a player is, for example, a configuration to update player information such that identification information of the player and identification information of the game medium are associated and stored.

Next, an operation of the apparatus 50 will be described.

Figure 17:
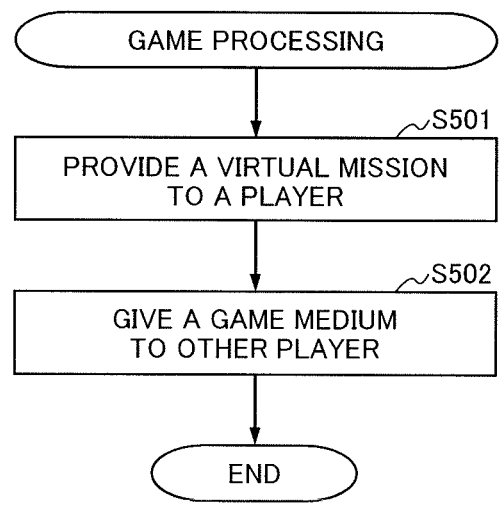
FIG. 17 is a flowchart showing an example of game processing corresponding to at least one of the embodiments of the present invention.

FIG. 17 is a flowchart illustrating an example of game processing carried out by the apparatus 50. In the game processing according to the present embodiment, processing which directly or indirectly relates to providing a virtual mission to a player and giving a game medium to other player is carried out.

The game processing is started when, for example, the apparatus 50 determines that a condition to provide a virtual mission is satisfied according to progress of a video game.

The apparatus 50 first provides a virtual mission to a player in the game processing (Step S501). In the present embodiment, the apparatus 50 provides to a player A a virtual mission whose condition to be provided is satisfied as a result that the player A plays a video game.

When providing the virtual mission, the apparatus 50 gives a game medium which is associated with the player using the game medium, to other player associated with the game medium used in the virtual mission (Step S502), and finishes the processing. In the present embodiment, the apparatus 50 gives the game medium which is associated with the player A, to a player B associated with the game medium used by the player A in the virtual mission.

As explained above, according to one aspect of the second embodiment, the video game processing apparatus 50 for controlling progress of a multiplayer participatory video game played using a game medium in which parameters are set up is configured so as to: include the virtual mission information storage section 51, the virtual mission providing section 52 and the game medium giving section 53; store virtual mission information being information on virtual missions which a player works on using a game medium; provide the virtual mission to a player on the basis of the virtual mission information; and give other player a game medium associated with the player using the game medium, the other player being associated with the game medium used in the virtual mission, so that it is possible to provide a feeling to cooperate with other player to each player.

As explained above, each embodiment of the present application can meet one, two or more needs. In this regard, an effect provided by each embodiment is a non-restrictive effect or an example of an effect.

Further, in each of the embodiments described above, the phrase "according to progress of a video game" means that specific processing is triggered by or based on occurrences of various progresses or changes which could occur in a video game. The specific processing includes, for example, determination processing and/or information update processing. Further, the various progresses or changes which could occur in a video game are, for example, progress of time, a change of a game element value, an update of a specific status or a flag or an operational input by a user.

INDUSTRIAL APPLICABILITY

The present invention is useful to provide a feeling to cooperate with other player to each player of a video game.

What is claimed is:

1. A video game processing apparatus for controlling progress of a multiplayer participatory video game via a network, the multiplayer participatory video game being played using a first game medium, parameters being set up in the first game medium, the video game processing apparatus comprising:
   a memory for storing virtual mission information, the virtual mission information being information on virtual missions, a player of the video game processing apparatus working on one of the virtual missions using the first game medium;
   a processor for: specifying a second game medium associated with the player to be given to an other player;

and executing the one of the virtual missions based on the virtual mission information; and a communication interface for giving the second game medium associated with the player using the first game medium to an other player via the network in response to the player accomplishing the one of the virtual missions, the other player being associated with the first game medium used by the player in the one of the virtual missions executed by the processor, wherein the first game medium and the second game medium comprise virtual media, and the second game medium is associated with identification data of the player working on the one of the virtual missions before the player accomplishes the one of the virtual missions.

2. The video game processing apparatus according to claim 1, wherein the memory stores player information, the player information indicating a status of each of a plurality of players, a player game medium possessed by each of the plurality of players, and an other player associated with the player game medium of each of the plurality of players, the processor specifies, at predetermined timing, a status of the other player corresponding to the player game medium possessed by the player, and the processor updates at least one predetermined parameter based on the status of the other player, the at least one predetermined parameter being set up in the player game medium.

3. The video game processing apparatus according to claim 2, further comprising:

a display controller for selectably displaying the player game medium, wherein, in a case where the processor updates the at least one parameter of the player game medium, the display controller displays the player game medium together with at least a part of the at least one parameter updated by the processor.

4. The video game processing apparatus according to claim 1, wherein the processor specifies the player who fails the one of the virtual missions as a player to be rescued, the processor specifies a rescue mission to rescue the player to be rescued based on the virtual mission information stored in the memory, the communication interface informs a plurality of players of the rescue mission via the network, the processor specifies a rescue mission executing player, the rescue mission executing player being one of the plurality of players who carries out the rescue mission, the processor provides the rescue mission to the rescue mission executing player, and the communication interface gives the second game medium associated with the player to be rescued to the rescue mission executing player who succeeded the rescue mission.

5. The video game processing apparatus according to claim 1, further comprising:

a controller interface for receiving selections from the player, wherein the memory stores game medium information, the game medium information containing information on game media, the information on the game media containing information on a player associated game medium and information on a non-associated game medium, the player associated game medium being associated with a specific player, the non-associated game medium not being associated with any player, the controller interface receives a selection of the one of the virtual missions from the player, the processor determines the non-associated game medium in accordance with a predetermined rule, the non-associated game medium corresponding to the one of the virtual missions selected by the player, and the processor gives the player the non-associated game medium for use in the one of the virtual missions.

6. The video game processing apparatus according to claim 1, wherein the second game medium comprises a virtual card.

7. The video game processing apparatus according to claim 1, wherein the communication interface gives the second game medium to the other video game processing apparatus in response to the player not failing the one of the virtual missions.

8. The video game processing apparatus according to claim 7, wherein the communication interface is configured to not give the second game medium to the other video game processing apparatus when the player fails the one of the virtual missions.

9. The video game processing apparatus according to claim 8, wherein the players receives an accomplishment privilege for completing the one of the virtual missions and giving the second game medium to the other video game processing apparatus.

10. A system for controlling for controlling the progress of the multiplayer participatory video game via the network, the system comprising:

the video game processing apparatus according to claim 1;

a server that specifies the one of the virtual missions to be provided to the player of the video game processing apparatus; and the other video game processing apparatus.

11. The video game processing apparatus according to claim 1, wherein an other player of the other video game processing apparatus is registered in a server as a friend of the player.

12. The video game processing apparatus according to claim 11, wherein a plurality of other players are registered in a server as a friend of the player, the processor acquires log-in times of the plurality of other players from the server via the communication interface, and the processor determines the other player from among the plurality of other players based on the log-in times of the plurality of other players.

13. The video game processing apparatus according to claim 1, wherein the second game medium associated with the player to be given to the other player is specified at a start of the one of the virtual missions.

14. The video game processing apparatus according to claim 13, wherein the video game processing apparatus specifies the second game medium associated with the player to be given to the other player.

15. The video game processing apparatus according to claim 14, wherein the video game processing apparatus specifies, at the start of the virtual mission, an accomplishment privilege to apply to the player.

16. The video game processing apparatus according to claim 15, wherein
the second game medium is given to the other player and the accomplishment privilege is applied to the player at accomplishment of the one of the virtual missions.

17. The video game processing apparatus according to claim 16, wherein
the video game processing apparatus specifies each of the second game medium and the accomplishment privilege independently.

18. The video game processing apparatus according to claim 1, wherein
the first game medium is associated with identification data of the other player before the player accomplishes the one of the virtual missions.

19. The video game processing apparatus according to claim 18, wherein
when the player accomplishes the one of the virtual missions, player information of the second game medium is updated to be associated with the identification data of the other player.

20. A non-transitory computer-readable medium including a video game processing program product for causing a computer to control progress of a multiplayer participatory video game, the multiplayer participatory video game being played over a network and using a first game medium, parameters being set up in the first game medium, wherein the computer comprises a memory for storing virtual mission information, the virtual mission information being information on virtual missions, a player of the video game processing apparatus working on one of the virtual missions using the first game medium, and the video game processing program product causes the computer to execute operations including:

specifying a second game medium associated with the player to be given to an other player;

executing the one of the virtual missions based on the virtual mission information; and giving the second game medium associated with the player using the first game medium to an other video game processing apparatus via the network in response to the player accomplishing the one of the virtual missions, the other player being associated with the second game medium used by the player in the one of the virtual missions, wherein the first game medium and the second game medium comprise virtual media, and the second game medium is associated with identification data of the player working on the one of the virtual missions before the player accomplishes the one of the virtual missions.

* * * * *